US009189887B2

(12) United States Patent
Yoshioka

(10) Patent No.: US 9,189,887 B2
(45) Date of Patent: Nov. 17, 2015

(54) INFORMATION PROCESSING APPARATUS AND INFORMATION PROCESSING METHOD

(75) Inventor: Yasuhiro Yoshioka, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 286 days.

(21) Appl. No.: 13/085,512

(22) Filed: Apr. 13, 2011

(65) Prior Publication Data

US 2012/0062550 A1    Mar. 15, 2012

Related U.S. Application Data

(60) Provisional application No. 61/381,095, filed on Sep. 9, 2010.

(51) Int. Cl.
*G06T 17/00*    (2006.01)
*G06F 17/30*    (2006.01)

(52) U.S. Cl.
CPC .......... *G06T 17/00* (2013.01); *G06F 17/30743* (2013.01); *G06F 17/30775* (2013.01)

(58) Field of Classification Search
CPC ......... G06T 15/00; G06T 19/20; G06T 17/00; G06T 19/00; G06Q 30/0643; G06F 17/30; G06F 17/00; G06F 3/00; G06F 13/00; G06F 7/20; G06F 17/30775; G06F 17/30743; G06F 3/0481; G06F 3/043; H04N 5/445; H04N 7/16

USPC ....... 345/419; 715/848–855; 700/94; 725/39, 725/142

See application file for complete search history.

(56) References Cited

U.S. PATENT DOCUMENTS

| 6,268,854 | B1 * | 7/2001 | Borden et al. ................ 715/786 |
| 6,943,811 | B2 * | 9/2005 | Matthews ...................... 345/660 |
| 2007/0107015 | A1 * | 5/2007 | Kazama et al. .................. 725/58 |
| 2008/0249644 | A1 * | 10/2008 | Jehan ............................. 700/94 |
| 2009/0132077 | A1 * | 5/2009 | Fujihara et al. ................. 700/94 |

FOREIGN PATENT DOCUMENTS

| JP | 2007-213531 | | 8/2007 |
| JP | 2007213531 A | * | 8/2007 |

OTHER PUBLICATIONS

Lamere, P. & Eck, D.:"Using 3D Visualization to Explore and Discover Music", In Proceesings of the 8th International Conference on Music Information Retrieval. Vienna, Austria 2007.*

(Continued)

*Primary Examiner* — Kee M Tung
*Assistant Examiner* — Michael Le
(74) *Attorney, Agent, or Firm* — Oblon, McClelland, Maier & Neustadt, L.L.P.

(57) ABSTRACT

An information processing apparatus that calculates a similarity between a plurality of pieces of content stored in a content storage unit, stores content information including information of the similarity obtained by the similarity calculation, generates a virtual three-dimensional display screen for content selection on the basis of stored content information, and allows selection of a piece of content from the virtual three-dimensional display screen.

17 Claims, 6 Drawing Sheets

(56) References Cited

OTHER PUBLICATIONS

Fabian Morchen, Alfred Ultsch, Mario Nocker, Christian Stamm: "Databionic visualization of music collections according to perceptual distance", In Proceedings of 6th International Conference on Music Information Retrieval. 2005.*

Jock D. Mackinlay, Stuart K. Card and George G. Robertson: "Rapid Controlled Movement Through a Virtual 3D Workspace", Computer Graphics, vol. 24, No. 4, Aug. 1990.*

* cited by examiner

INFORMATION PROCESSING APPARATUS AND INFORMATION PROCESSING METHOD

CROSS REFERENCE TO RELATED APPLICATION

The present application claims the benefit of the earlier filing date of U.S. Provisional Patent Application Ser. No. 61/381,095 filed on Sep. 9, 2010, the entire contents of which is incorporated herein by reference.

BACKGROUND OF THE DISCLOSURE

1. Field of the Disclosure

The present disclosure relates to an information processing apparatus having a content playback function with which, for example, content such as music is played back and an information processing method, and more particularly to a technique by which selection of content can be appropriately performed.

2. Description of the Related Art

The number of songs that can be stored in a portable music playback apparatus is increasing because of the expansion of memory capacity for storing music data. In order to play back music, a user typically makes a display unit display a one-dimensional song list in which, for example, the order of songs is fixed, and then selects a song to be played from the displayed song list.

In addition, selection of a song list is performed by using, for example, a content search function that utilizes folder structure display having a tree structure.

In Japanese Unexamined Patent Application Publication No. 2007-213531, in order for the user to easily find a piece of content suitable for the user from a lot of content, it is described that an image of a virtual three-dimensional space in which a plurality of display elements related to the content are arranged is displayed. It is also described that the user can select a desired piece of content by moving an instruction position in the virtual three-dimensional space.

SUMMARY

As described above, in the case of folder structure display having a tree structure, it is difficult to visually check the features of each piece of content and the operability during selection is not satisfactory.

Although the operability is improved through virtual three-dimensional display for selection of a particular song from a single group as in Japanese Unexamined Patent Application Publication No. 2007-213531, there has been a problem in that the virtual three-dimensional display may not deal with a case in which a plurality of groups are searched for a desired song. That is, because there are usually a plurality of groups in which songs are sorted in different ways, such as a group in which the songs are sorted in chronological order, a group of songs by the same artist, and a group of the user's favorite songs, the user may not search groups other than ones offered by an apparatus. Therefore, it has been difficult to perform a simple search over a plurality of groups.

The present disclosure has been made in view of this situation, and it is desirable to realize simple and secure selection of content such as songs regardless of groups or the like.

According to an embodiment of the present disclosure, an information processing apparatus calculates a similarity between a plurality of pieces of content stored in a content storage unit, stores content information including information of the similarity obtained by the similarity calculation, generates a virtual three-dimensional display screen for content selection on the basis of stored content information, and allows selection of a piece of content from the virtual three-dimensional display screen.

By generating and displaying the virtual three-dimensional display screen for the content selection utilizing the similarity of content in this manner, it is made possible to, for example, execute content selection display covering a plurality of groups.

According to an embodiment of the present disclosure, display based on the similarity of content can be executed in a content selection screen in which the virtual three-dimensional display is performed, and accordingly the user can, for example, easily select a piece of content similar to another piece of content categorized in a different group.

DESCRIPTION OF THE PREFERRED EMBODIMENTS

Preferred embodiments of the present disclosure are described hereinafter in the following order:

1. Example of General Configuration of Apparatus According To Embodiment (FIG. 1)
2. Example of Configuration Related To Music Playback According To Embodiment (FIG. 2)
3. Example of Process of Constructing Music Information Database (FIGS. 3 and 4)
4. Example of Song Selection Process According To Embodiment (FIGS. 5 to 9)
5. Other Modifications 1. Example of General Configuration of Apparatus According to Embodiment First, a general configuration of an apparatus according to an embodiment of the present disclosure is described with reference to FIG. 1.

According to this embodiment, an information processing apparatus having a content playback function (music playback function) is applied to a mobile phone terminal.

Figure 1:
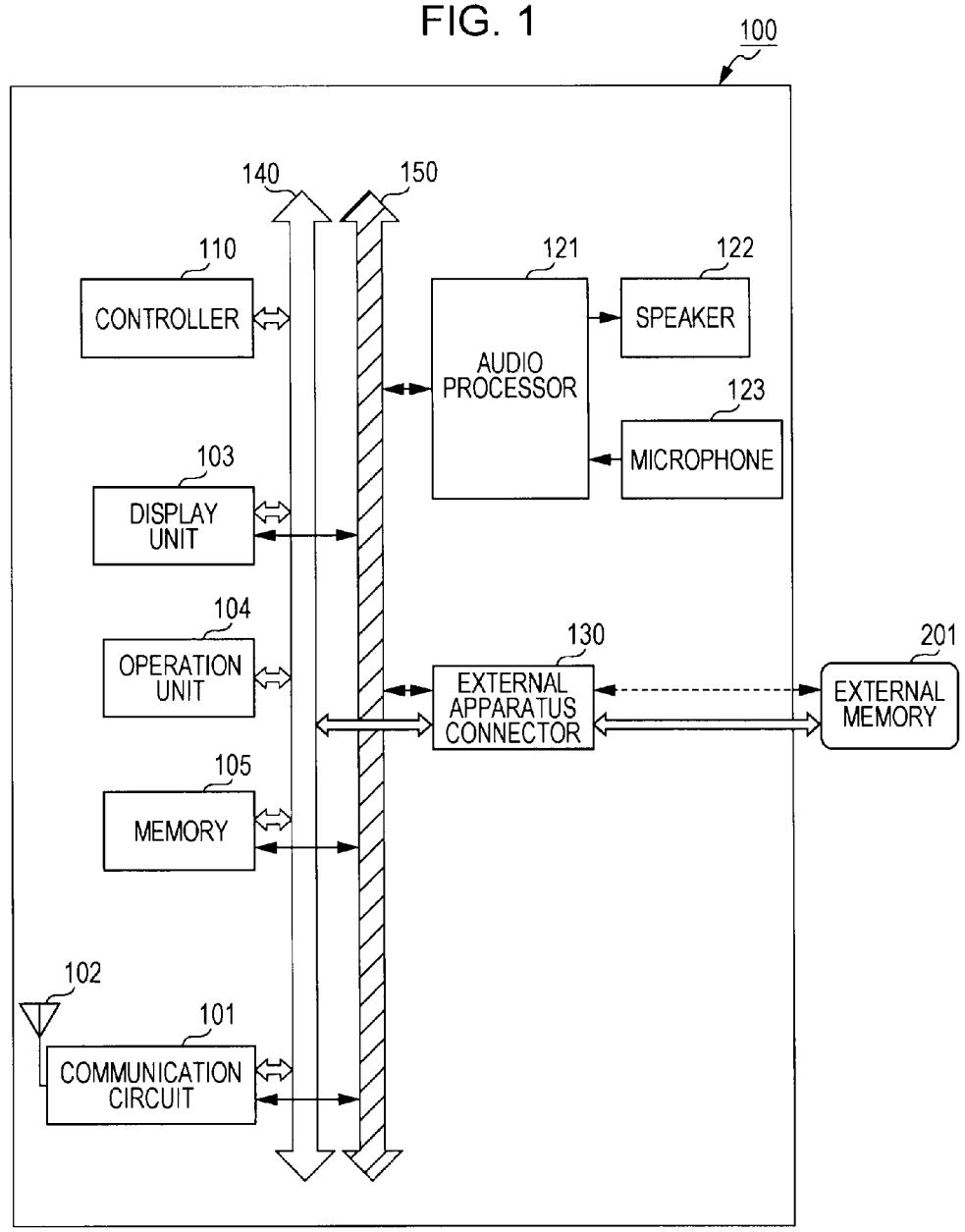
FIG. 1 is a block diagram illustrating a general configuration of an apparatus according to an embodiment of the present disclosure.

As illustrated in FIG. 1, a mobile phone terminal 100 has a communication circuit 101 to which an antenna 102 is connected, and the communication circuit 101 communicates with a wireless telephone base station or the like through wireless communication. Voice data contained in data received by the communication circuit 101 is supplied to an audio processor 121 through a data line 150. The voice data supplied to the audio processor 121 is then subjected to demodulation and the like and supplied to a speaker 122 as an analog voice signal so as to be output. In addition, a voice signal input to a microphone 123 is modulated by the audio processor 121 into voice data of a predetermined format, which is supplied to the communication circuit 101 through the data line 150 and then transmitted by wireless transmission.

In addition, when the communication circuit 101 receives mail data, web browsing screen data, or the like, the received data is processed.

These wireless communication processes are executed by control performed by a controller 110. The controller 110 is configured to exchange control data with each unit in the mobile phone terminal 100 through a control line 140. A display process for a search performed for the music playback function, which will be described later, is also executed by control performed by the controller 110.

The audio processor 121 performs not only the voice process for a telephone call but also a playback process for audio data, which is music data stored in a memory 105 or the like in the mobile phone terminal 100. The audio data subjected to the playback process is output from the speaker 122. The audio data may be output from headphones, which are not shown, instead. The audio data may be wirelessly transmitted to another audio playback device by using a short-range radio communication function so as to be output.

The mobile phone terminal 100 also has a display unit 103 formed of a liquid crystal display panel or the like, which performs various types of display necessary for a mobile phone terminal. The display unit 103 is configured to generate a guidance display for allowing selection of a song to be played when an audio playback function is executed. A display panel included in the display unit 103 is formed of, for example, a touch panel, so that an operator can perform various operations related to display by touching the surface of the display panel with his/her finger or the like.

The mobile phone terminal 100 also has an operation unit 104 formed of various operation buttons and the like, so that operation data of the operation unit 104 is supplied to the controller 110. The operation unit 104 includes number keys for performing dialing as a mobile phone terminal and various function keys, as well as keys for instructing audio playback and the like. In addition, as keys for designating a position in a display image, an up key, a down key, a left key, and a right key, as well as a key for designating a direction from a near side to a far side (and one for the opposite direction) are included.

The mobile phone terminal 100 also has a memory 105, which stores various pieces of data necessary for a mobile phone terminal. The memory 105 is configured to store music data, which is content data. The memory 105 also stores programs for performing the display process for searching for a song, which is a characteristic of this embodiment, and databases. A memory used for storing the content data (music data) and the like may be a memory card removably attached to the apparatus body.

The mobile phone terminal 100 also has an external apparatus connector 130, so that data stored in an external memory 201 can be obtained. The external memory 201 is, for example, a memory for storing music data and may be connected to the mobile phone terminal 100 by a cable or through wireless communication.

2. Example of Configuration Related to Music Playback According to Embodiment

Next, a detailed configuration of the audio playback function of the mobile phone terminal 100 according to this embodiment is described with reference to FIG. 2.

Figure 2:
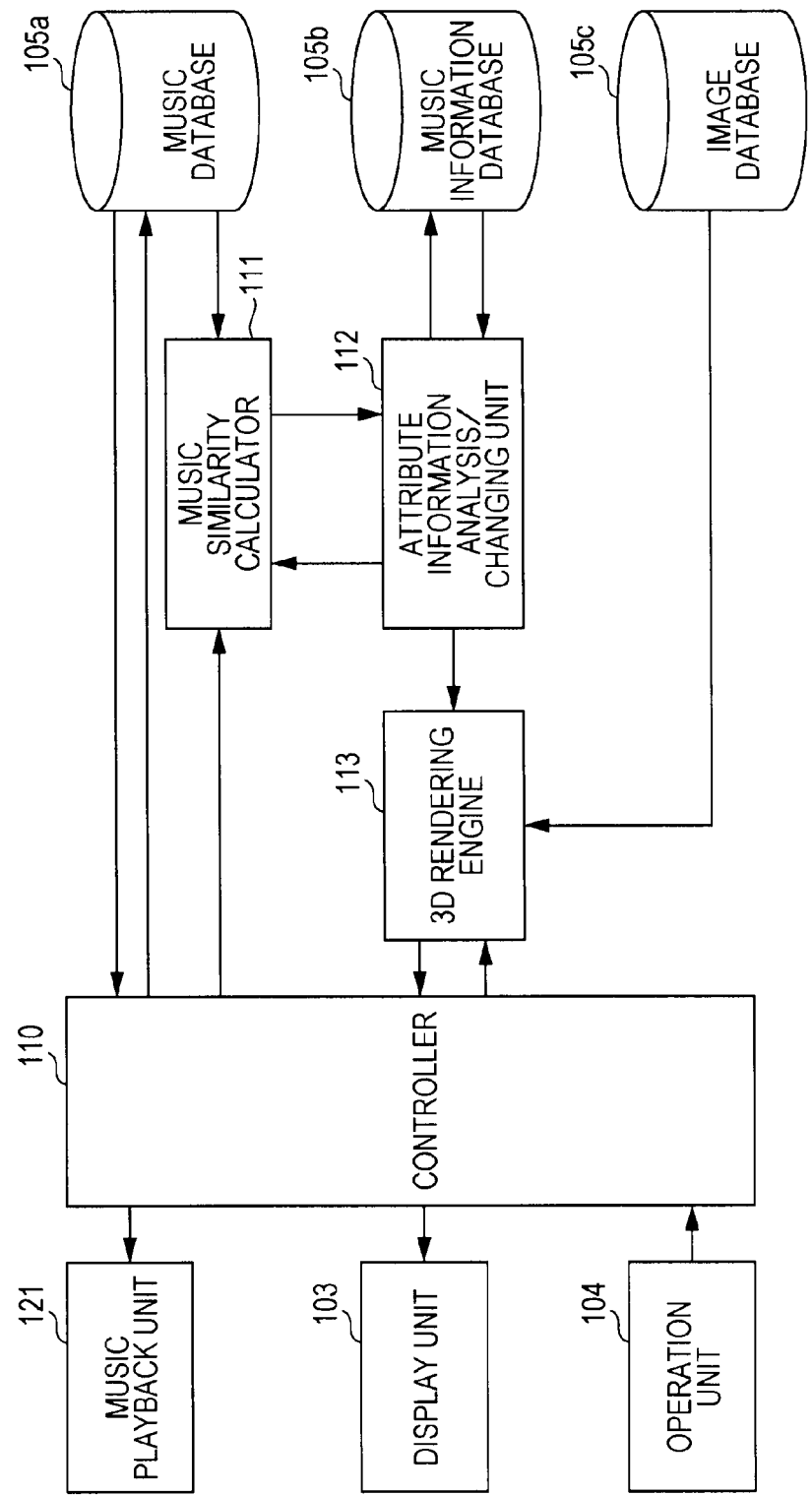
FIG. 2 is a block diagram illustrating a configuration example related to music playback performed by the apparatus according to an embodiment of the present disclosure.

As illustrated in FIG. 2, the audio processor 121, which is a music playback unit, executes an audio playback process on the basis of control performed by the controller 110. The controller 110 also controls the display unit 103 to make the display unit 103 display a screen for allowing selection of the song to be played, as well as information, an image, and the like related to the song during playback.

When the operation unit 104 is operated on the basis of the screen displayed on the display unit 103, the controller 110 selects the song to be played and makes the audio processor 121 perform the playback process for the selected song. The playback process may be performed by operating the touch panel instead of operating the operation unit 104.

The music data (audio data) for the audio playback is stored in a music database 105a configured by using part of the storage capacity of the memory 105. The mobile phone terminal 100 also has a music information database 105b that is configured by using part of the storage capacity of the memory 105 and that stores various pieces of information related to music stored in the music database 105a. Music information accompanying the music data stored in the music database 105a is stored in the music information database 105b. The music information accompanying the music data includes, for example, album titles, song titles, and artist names.

As illustrated in FIG. 2, the mobile phone terminal 100 also has a music similarity calculator 111, which calculates the similarity of each song stored in the music database 105a. The obtained similarity data is transmitted to an attribute information analysis/changing unit 112, which performs a process for changing attribute information stored in the music information database 105b.

In addition, a process for generating a display screen for song selection is executed by control performed by the controller 110 on the basis of the music information stored in the music information database 105b. At this time, a 3D rendering engine 113 generates a selection screen in the form of virtual three-dimensional display by using the music information retrieved from the music information database 105b. The generated virtual three-dimensional display is displayed on the display unit 103.

The mobile phone terminal 100 also has an image database 105c that is configured by using part of the storage capacity of the memory 105 and that stores images related to the music stored in the music database 105a. The image database 105c stores jacket (cover) images of albums included in the music.

3. Example of Process of Constructing Music Information Database

Figure 3:
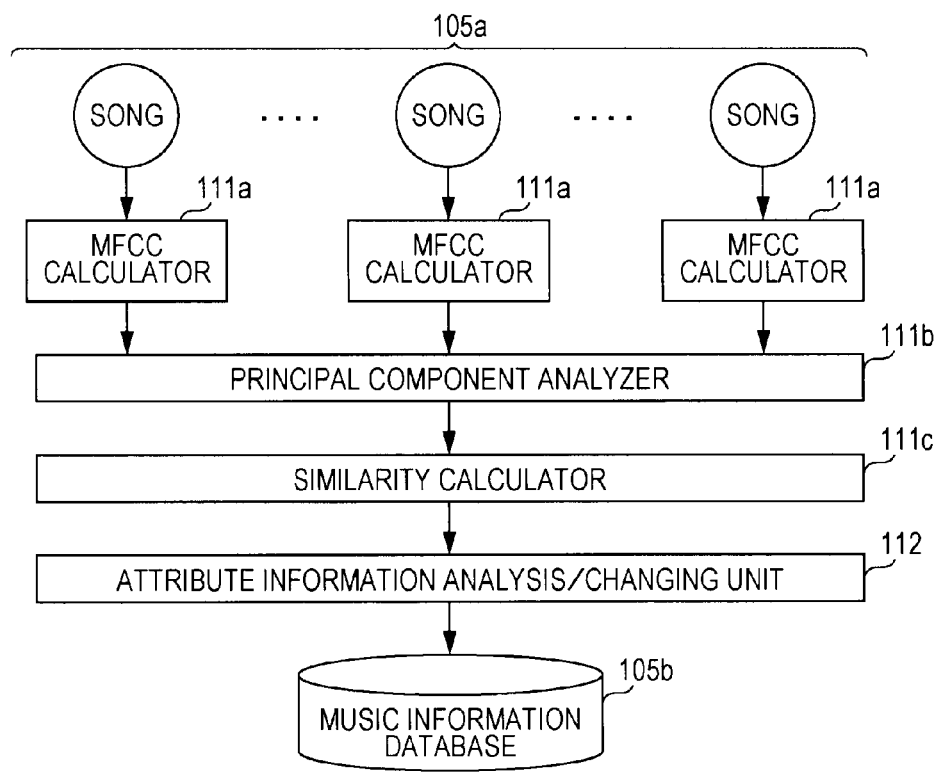
FIG. 3 is a block diagram illustrating a configuration example in which a music information database according to an embodiment of the present disclosure is constructed.

Next, a process of constructing a music information database according to this embodiment is described with reference to FIG. 3.

The similarity of the audio data of each song stored in the music database 105a is calculated by the music similarity calculator 111. As a specific component of a similarity calculation process, for example, a mel-frequency cepstrum coefficient (MFCC) calculator 111a calculates an MFCC.

The MFCC is obtained from a theory for analyzing speech waveforms, and allows a feature quantity of a song to be extracted in twelve dimensions in this case. Results obtained by the MFCC calculator 111*a* are supplied to a principal component analyzer 111*b* to be subjected to principal component analysis. By using results of the principal component analysis, a similarity calculator 111*c* calculates the similarity between pieces of information as a distance in three-dimensional space.

The attribute information analysis/changing unit 112 then performs a process for updating the data stored in the music information database 105*b* so that the obtained information of the distance in the three-dimensional space is added to the music information. The information of the distance in the three-dimensional space may be calculated for each display process without being stored in the database.

The attribute information analysis/changing unit 112 analyzes and extracts an object attribute of each song on the basis of the data stored in the music information database 105*b*, and performs updating if necessary.

A song selection screen generated on the basis of the data stored in the music information database 105*b* may be generated by using the similarity or without using the similarity. When each song selection screen is generated, the music information database 105*b* and the attribute information analysis/changing unit 112 transmit necessary information to the 3D rendering engine 113 in order to generate a corresponding virtual three-dimensional display screen. A specific example of the three-dimensional display screen will be described later. The term "virtual three-dimensional display" herein refers to a process in which a display panel that displays two-dimensional images is used to virtually display the images in a three-dimensional manner.

Figure 4:
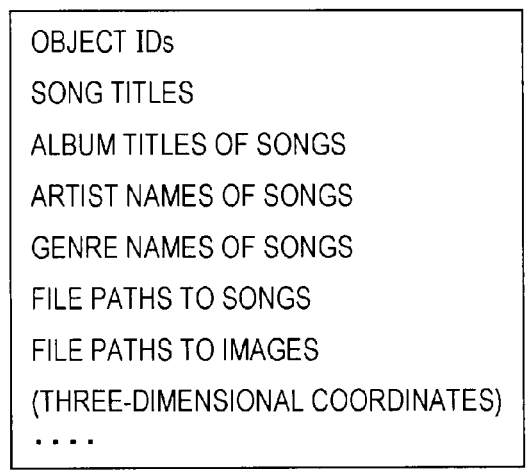
FIG. 4 is an explanatory diagram illustrating an example of attribute information of an object according to an embodiment of the present disclosure.

FIG. 4 illustrates a part of the music information stored in the music information database 105*b*.

More specifically, the music information includes object IDs, song titles, album titles of the songs, artist names of the songs, names of genres to which the songs belong, file paths to the music database 105*a*, file paths to the image database 105*c* storing jacket images, and distance data calculated from the similarity.

4. Example of Song Selection Process According to Embodiment

Next, an example of a process for selecting a song on the basis of the display is described with reference to FIG. 5.

Figure 5:
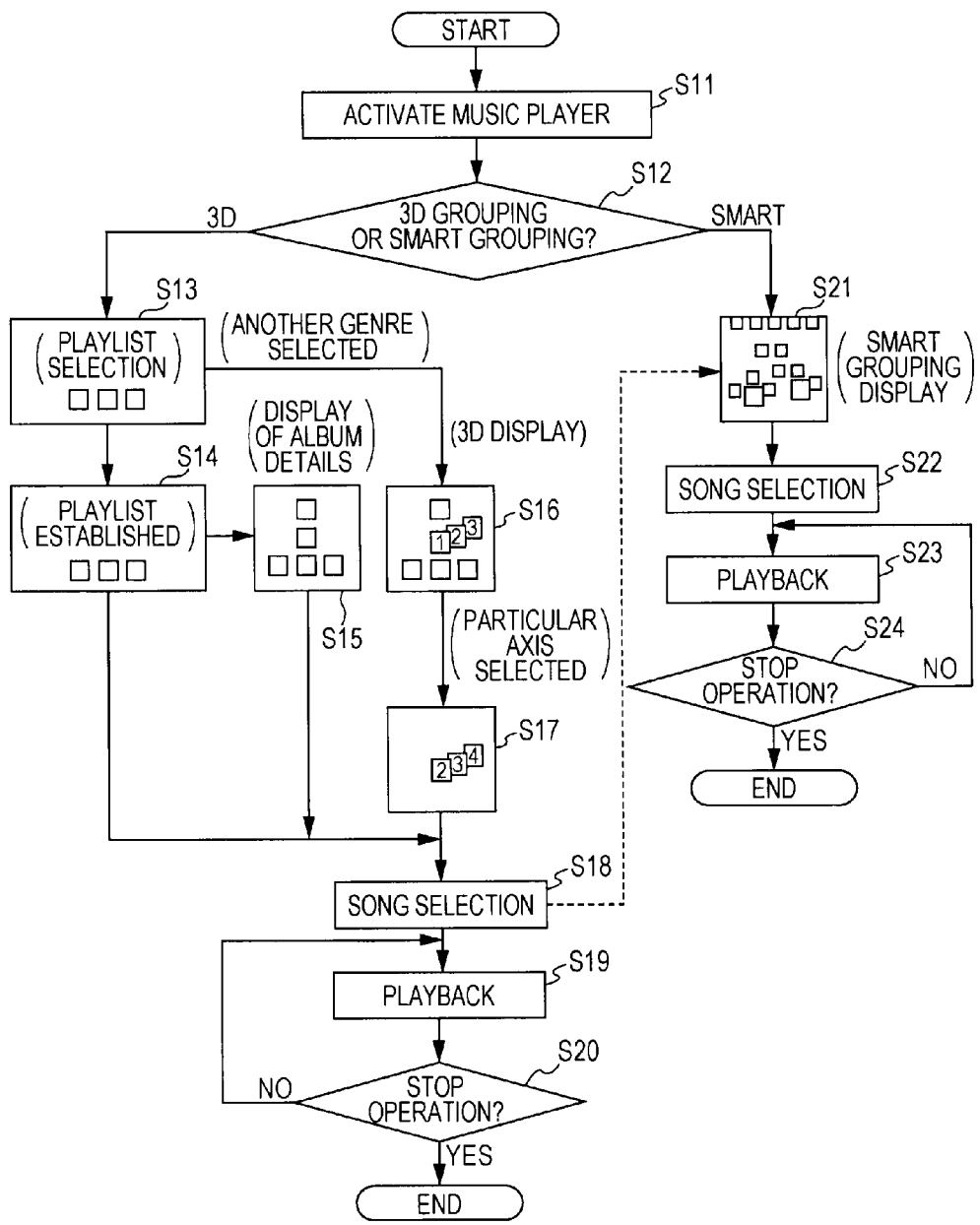
FIG. 5 is a flowchart illustrating an example of a song selection process according to an embodiment of the present disclosure.

A flowchart in FIG. 5 illustrates the flow of the song selection process. According to FIG. 5, first, when a user performs an operation for activating a music player function, the controller 110 activates the corresponding function (step S11). The controller 110 then determines whether 3D grouping display or smart grouping display is set as a mode of song display (step S12).

If the mode is the 3D grouping display, a list of jacket images of songs in each genre is displayed (step S13). At this time, the images of songs in a playlist are, for example, horizontally aligned and displayed.

When a particular jacket image is selected from the list of jacket images (step S14), other songs by the artist of the selected album are also listed (step S15). Either the virtual three-dimensional display or the two-dimensional display may be performed for steps S13, S14, and S15.

When a particular song is selected in step S14, or when another song is selected in step S15, the processing moves to a selection confirmation process of step S18 and the corresponding song is played back in step S19. After the playback, it is determined whether or not a stop operation has been performed (step S20), and if a stop operation has been performed, the playback is stopped and the processing terminates. The stop operation is performed by, for example, pressing a playback button again.

In addition, if an operation for selecting another genre is performed while the list of jacket images is displayed in step S13, the jacket images are displayed in the virtual three-dimensional display with the selected song arranged in the center and the similarity to the song used as an axis (dimension) (step S16).

When a particular jacket image along the axis of the similarity is selected during the virtual three-dimensional display, songs of the album having the jacket image or the like are displayed for the song selection (step S17). When an operation for selecting a song is performed, the processing moves to the selection confirmation process of step S18 and the corresponding song is played back in step S19.

When the song selection is confirmed in step S18, the confirmed song is registered as a played-back song.

If the smart grouping display is selected in step S12, images of songs are arranged in the virtual three-dimensional space on the basis of the similarity calculation. In that case, for example, the similarity is represented by an axis extending from the near side to the far side and other axes represent genres, artists, or the like in the three-dimensional display.

During the three-dimensional display, if there are albums or songs to be recommended as a result of calculation performed by the apparatus, the images of the songs or the albums may be displayed in a line in a portion of the screen separated from the three-dimensional display, such as in an upper portion of the screen.

When a particular album or song is selected during this display, the processing moves to a selection confirmation process of step S22 and the corresponding song is played in step S23. After the playback, it is determined whether or not a stop operation has been performed (step S24), and if a stop operation has been performed, the playback is stopped and the processing terminates.

A specific example of the virtual three-dimensional display condition according to this embodiment is described with reference to FIGS. 6 to 9.

Figure 6:
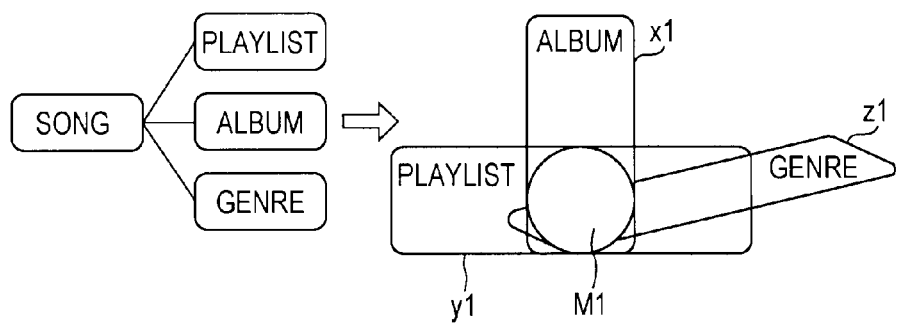
FIG. 6 is an explanatory diagram illustrating an example of grouping according to an embodiment of the present disclosure.

FIG. 6 illustrates an example in which songs are displayed in the virtual three-dimensional display by using playlists, albums, and genres as the three axes. In this example, the songs are arranged in order of album along an axis X1, which is a vertical axis of the screen, and in order of playlist along an axis Y1, which is a horizontal axis of the screen. The songs are arranged in order of genre along an axis Z1, which is an axis extending from the near side to the far side of the screen.

Display positions of the images are determined by using these three axes (dimensions). An image of a particular song M1 can be displayed on the near side by arbitrarily moving a position to be determined as the center along each axis through a user operation using the operation unit 104.

Figure 7:
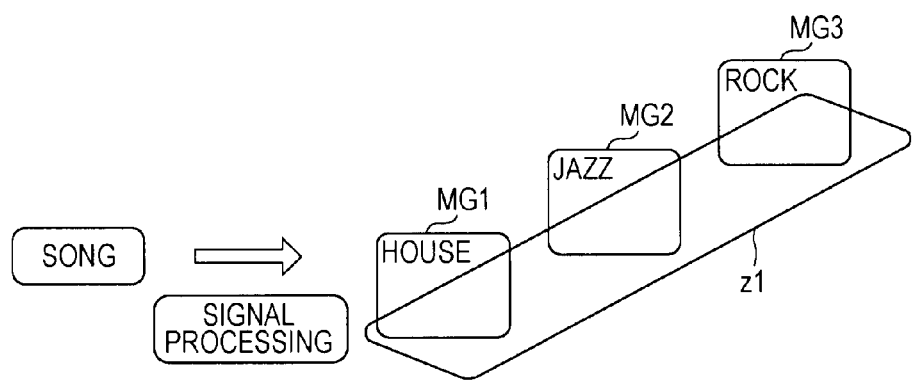
FIG. 7 is an explanatory diagram illustrating another example of grouping according to an embodiment of the present disclosure.

FIG. 7 illustrates an example of displaying songs in the virtual three-dimensional display by using similarity. In this example, songs MG2, MG3, and the like having high similarities to a song MG1 that is currently located in the center of the near side are arranged along the axis Z1 extending from the near side to the far side of the screen in order of similarity calculated in the process illustrated in FIG. 3. In this case, the similarity is calculated regardless of the genre and therefore songs in different genres can be arranged together in the same screen.

What the X- and Y-axes represent in this case are selected from the music information. For example, the X-axis represents the genre and the Y-axis represents the playlist. In the example of FIG. 7, the song MG1 is in a house-related genre, the song MG2 is in a jazz-related genre, and the song MG3 is in a rock-related genre. The songs MG2 and MG3 are arranged in terms of similarity to the song MG1 on the near side. Songs in the same genre as each of the songs MG1, MG2, and MG3 are arranged along the X- and Y-axes in the corresponding positions on the Z-axis.

Figure 8:
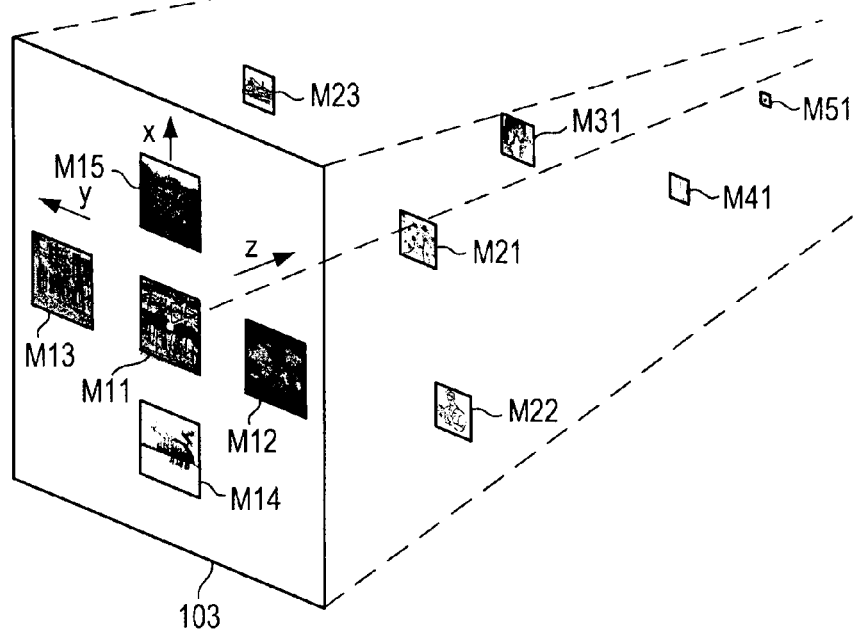
FIG. 8 is an explanatory diagram illustrating an example of a virtual three-dimensional arrangement according to an embodiment of the present disclosure in a three-dimensional manner.
Figure 9:
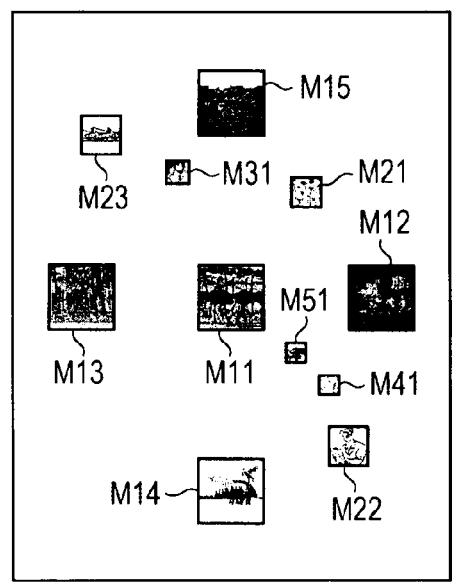
FIG. 9 is an explanatory diagram illustrating a display example of the virtual three-dimensional arrangement according to an embodiment of the present disclosure.

FIGS. 8 and 9 illustrate an example of the virtual three-dimensional display condition.

In FIG. 8, a rectangular region on the near side indicates an area displayed by the display unit 103. When images are displayed on the display unit 103, the further away the images are displayed along the Z-axis, the smaller the sizes of the images become.

For example, when a song M11 is displayed in the center of the nearest side, other songs M12, M13, M14, and M15 in the same genre as that of the song M11 are displayed along the X- and Y-axes in accordance with the order of playback history, album title, and the like.

In addition to that, in this display format, songs M21 and M31 in other genres are arranged along the Z-axis in accordance with similarity to the song M11. In the virtual three-dimensional display, images become smaller as the display positions of the images along the Z-axis become more distant from the near side.

Other songs M22, M23, and the like are displayed along the X- and Y-axes at positions having the same distances to the near side as the corresponding songs M21 and M31.

FIG. 9 is an image of when the display of FIG. 8 is viewed two-dimensionally. As illustrated in FIG. 9, since the virtual three-dimensional display is performed, the sizes of the images corresponding to the songs are different in accordance with the positions thereof along the Z-axis.

By performing the three-dimensional display of songs in accordance with the similarities calculated in the apparatus in this manner, transition between different groups (genres, etc.) of songs, which has been difficult, can be performed by the user in an easy-to-understand manner. In addition, by automatically grouping similar songs, a new group arranged in order of similarity to a designated song is generated, which makes it possible to display the songs together on the selection screen even when the songs do not belong to any particular group or genre.

Furthermore, by displaying the songs in order of similarity, it is made possible to recommend a song similar to a song designated by the user.

5. Other Modifications

Although an information processing apparatus according to an embodiment of the present disclosure is a music playback apparatus applied to a mobile phone terminal in the above embodiment, the information processing apparatus may be formed as a single-purpose music playback apparatus that has no wireless communication function. The information processing apparatus may be formed as a music playback apparatus combined with various other electronic devices instead.

In addition, although the information processing apparatus according to an embodiment of the present disclosure is applied to an apparatus that plays back music as content in the above embodiment, the information processing apparatus may be applied to apparatuses that play back other types of content. For example, the process according to the above embodiment may be applied to an apparatus that plays back visual content for a screen display for selecting a piece of visual content.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
circuitry configured to:
calculate a similarity between a plurality of songs stored in a memory;
store content information including information of the similarity obtained by the similarity calculation;
generate a virtual three-dimensional display screen for song selection on a basis of data stored in the content information;
allow selection of a song from the virtual three-dimensional display screen, wherein:
the virtual three-dimensional display screen includes a base image corresponding to a reference song of the plurality of songs located in a center of the display screen, a first linear axis (X) that extends vertically across the display screen and originates at the base image on which images corresponding to a first plurality of songs of the plurality of songs are displayed in a direction extending away from the base image in decreasing order of similarity with respect to album similarity to the reference song, a second linear axis (Y) that extends horizontally across the display screen and originates at the base image on which images corresponding to a second plurality of songs of the plurality of songs are displayed in a direction extending away from the base image in decreasing order of similarity with respect to playlist similarity to the reference song, and a third linear axis (Z) that extends from a near side to a far side of the display screen and originates at the base image on which images corresponding to a third plurality of songs of the plurality of songs are displayed in a direction extending away from the base image in decreasing order of similarity with respect to genre similarity to the reference song, and
the images that correspond to the third plurality of songs become smaller in size the farther the images are away from the near side of the display screen and are disposed on a plurality of planes, the plurality of planes intersecting the third linear axis (Z) at different positions and each of the planes being coplanar with the display screen; and
generate a plurality of recommended song images corresponding to a plurality of recommended songs together with and separate from the generated virtual three-dimensional display screen on the display screen, such that the generated plurality of recommended song images and the generated virtual three-dimensional display screen are simultaneously displayed on the display screen, wherein
an edge of each of the generated plurality of recommended song images is in contact with an edge of the display screen.

2. The information processing apparatus of claim 1, wherein the similarity calculation applies a mel-frequency cepstrum coefficient (MFCC) calculator to calculate a MFCC of each of the plurality of songs.

3. The information processing apparatus of claim 2, wherein the similarity calculation applies a principal component analyzer to perform a principal component analysis on the MFCC of each of the plurality of songs output from the MFCC calculator.

4. The information processing apparatus of claim 3, wherein the similarity calculation includes calculating the similarity of the plurality of songs using an output of the principal component analyzer.

5. The information processing apparatus of claim 1, wherein the similarity calculation includes calculating the similarity between the plurality of songs as coordinates in a three-dimensional space.

6. The information processing apparatus of claim 1, wherein the similarity calculation includes calculating the similarity between the plurality of songs as distances in a three-dimensional space.

7. The information processing apparatus of claim 1, wherein an image corresponding to an album cover is displayed to represent each of the plurality of songs on the virtual three-dimensional display screen.

8. The information processing method of claim 1, wherein an image corresponding to an album cover is displayed to represent each of the plurality of songs on the virtual three-dimensional display screen.

9. The information processing apparatus of claim 1, wherein the generated plurality of recommended song images are displayed on an upper portion of the display screen.

10. The information processing apparatus of claim 1, wherein a number of the plurality of recommended song images is five.

11. An information processing method comprising:
calculating a similarity between a plurality of songs stored in a memory;
storing content information including information of the similarity obtained by the similarity calculation;
generating a virtual three-dimensional display screen for song selection on a basis of stored content information;
allowing selection of a song from the virtual three-dimensional display screen, wherein:
the virtual three-dimensional display screen includes a base image corresponding to a reference song of the plurality of songs located in a center of the display screen, a first linear axis (X) that extends vertically across the display screen and originates at the base image on which images corresponding to a first plurality of songs of the plurality of songs are displayed in a direction extending away from the base image in decreasing order of similarity with respect to album similarity to the reference song, a second linear axis (Y) that extends horizontally across the display screen and originates at the base image on which images corresponding to a second plurality of songs of the plurality of songs are displayed in a direction extending away from the base image in decreasing order of similarity with respect to playlist similarity to the reference song, and a third linear axis (Z) that extends from a near side to a far side of the display screen and originates at the base image on which images corresponding to a third plurality of songs of the plurality of songs are displayed in a direction extending away from the base image in decreasing order of similarity with respect to genre similarity to the reference song, and
the images that correspond to the third plurality of songs become smaller in size the farther the images are away from the near side of the display screen and are disposed on a plurality of planes, the plurality of planes intersecting the third linear axis (Z) at different positions and each of the planes being coplanar with the display screen; and
generating a plurality of recommended song images corresponding to a plurality of recommended songs together with and separate from the generated virtual three-dimensional display screen on the display screen, such that the generated plurality of recommended song images and the generated virtual three-dimensional display screen are simultaneously displayed on the display screen, wherein
an edge of each of the generated plurality of recommended song images is in contact with an edge of the display screen.

12. The information processing method of claim 11, wherein the calculating includes calculating a mel-frequency cepstrum coefficient (MFCC) of each of the plurality of songs.

13. The information processing method of claim 12, wherein the calculating includes performing a principal component analysis on the MFCC of each of the plurality of songs.

14. The information processing method of claim 13, wherein the calculating includes calculating the similarity of the plurality of songs based on an output of the principal component analysis.

15. The information processing method of claim 11, wherein the calculating includes calculating the similarity between the plurality of songs as coordinates in a three-dimensional space.

16. The information processing method of claim 11, wherein the calculating includes calculating the similarity between the plurality of songs as distances in a three-dimensional space.

17. A non-transitory computer-readable medium including computer program instructions, which when executed by an information processing apparatus, cause the information processing apparatus to perform a method, the method comprising:
calculating a similarity between a plurality of songs stored in a memory;
storing content information including information of the similarity obtained by the similarity calculation;
generating a virtual three-dimensional display screen for song selection on a basis of stored content information;
allowing selection of a song from the virtual three-dimensional display screen, wherein:
the virtual three-dimensional display screen includes a base image corresponding to a reference song of the plurality of songs located in a center of the display screen, a first linear axis (X) that extends vertically across the display screen and originates at the base image on which images corresponding to a first plurality of songs of the plurality of songs are displayed in a direction extending away from the base image in decreasing order of similarity with respect to album similarity to the reference song, a second linear axis (Y) that extends horizontally across the display screen and originates at the base image on which images corresponding to a second plurality of songs of the plurality of songs are displayed in a direction extending away from the base image in decreasing order of similarity with respect to playlist similarity to the reference song, and a third linear axis (Z) that extends from a near side to a far side of the display screen and originates at the base image on which images corresponding to a third plurality of songs of the plurality of songs are displayed in a direction extending away from the base image in decreasing order of similarity with respect to genre similarity to the reference song, and the images that correspond to the third plurality of songs become smaller in size the farther the images are away from the near side of the display screen and are disposed on a plurality of planes, the plurality of planes intersecting the third linear axis (Z) at different positions and each of the planes being coplanar with the display screen; and generating a plurality of recommended song images corresponding to a plurality of recommended songs together with and separate from the generated virtual three-dimensional display screen on the display screen, such that the generated plurality of recommended song images and the generated virtual three-dimensional display screen are simultaneously displayed on the display screen, wherein an edge of each of the generated plurality of recommended song images is in contact with an edge of the display screen.

* * * * *